United States Patent [19]
Heller

[11] 3,762,796
[45] Oct. 2, 1973

[54] ADJUSTABLE SUPPORT OR STAND FOR AN OPTICAL OBSERVATION INSTRUMENT

[75] Inventor: Rudolf Heller, Zurich, Switzerland

[73] Assignee: Contraves AG, Zurich, Switzerland

[22] Filed: Oct. 13, 1971

[21] Appl. No.: 188,933

[30] Foreign Application Priority Data
Jan. 14, 1971 Switzerland............................ 531/71

[52] U.S. Cl. ................................................ 350/85
[51] Int. Cl. ............................................ G02b 23/16
[58] Field of Search .................... 350/82, 83, 84, 85

[56] References Cited
UNITED STATES PATENTS
3,475,075 10/1969 Stone................................... 350/85
2,651,560 9/1953 Gerber................................. 350/85

FOREIGN PATENTS OR APPLICATIONS
1,901,180 11/1969 Germany ............................. 350/85

Primary Examiner—David H. Rubin
Attorney—Werner W. Kleeman

[57] ABSTRACT

An adjustable support or stand for an optical observation instrument, especially for a binocular microscope, the position and/or orientation of which can be freely adjusted and fixed within a desired spatial zone or area, and wherein the observation device is connected through the agency of a three-axes full Cardan rod assembly, rendering possible its freely combined rotational movement about three axial directions perpendicular to one another by means of a handgrip, at a spatially freely adjustable terminal piece of a pivot rod assembly, which is mounted at a stationary support.

9 Claims, 3 Drawing Figures

ADJUSTABLE SUPPORT OR STAND FOR AN OPTICAL OBSERVATION INSTRUMENT

BACKGROUND OF THE INVENTION

The present invention relates to a new and improved adjustable support or stand for an optical observation instrument.

The support or stand of this invention can be, for instance, used in conjunction with a telescope, binoculars, a camera, also for instance a TV-camera. However, according to a preferred environment of use, the invention is directed to a support or stand for a binocular microscope, as such can be employed for manufacturing or assembling precision mechanical, optical or electrical components, but also for carrying out surgical operations, especially brain surgery. During such use of observation instruments, the requirement exists of providing a support or stand, by means of which the observation instrument or device can be quickly and sufficiently selectively accurately oriented and appropriately brought into visual alignment with each localized zone or region of a larger area. Upon reaching the desired position and/or orientation the observation device must be able to be fixed in such selected position.

It should be recognized that especially when performing brain surgery, the surgeon is particularly dependent upon an observation device embodying a binocular microscope which he can adjust at a location which is not disturbing to him into a position for viewing the operation zone. He then uses such binocular microscope for the microscopic observation of certain regions of the operating zone. Furthermore, the surgeon should be able to quickly and positively adjust the binocular microscope into the desired effective position so as to be an aid to him in carrying out incisions and surgical manipulations.

According to certain heretofore known constructions of stands suitable for this purpose there is arranged at a support which, for instance, through the agency of a spindle drive can be translatory adjusted in three coordinate directions, a pivot construction serving as means for rotating the observation device into its desired orientational position. In that case one is not concerned with a full Cardan or universal joint, rather a joint or hinge connection for selected orientational changes, for instance those undertaken along the surface of a cone about a given observation locality. With this type prior art construction it is not possible to quickly undertake in a direct manner the translatory spatial adjustments of the observation device. Quite to the contrary, the adjustment movement must be performed through three movement components parallel to the axes of a spatially fixed coordinate system. Additionally, with such type prior art support construction after having carried out the desired adjustment of the observation device into desired position and orientation, the observation device or the objective thereof must be additionally adjusted in the observation direction for the purpose of focusing. These complicated actuation manipulations or operations which are here required and which are not matched to the motor reflexes of the human being hinder the doctor in his work which oftentimes entail quickly changing situations requiring correspondingly rapid and positive corrective measures.

In the environment of use under discussion it is of course desirable that the optical observation device should be capable of adjustment as easily as magnifying glasses or binoculars which are simply held by the hand of the user, but must be capable of being fixed in every selected position.

SUMMARY OF THE INVENTION

Accordingly, from what has been stated above it will be seen that the art is still really in need of an adjustable support or stand for an optical observation instrument which is not associated with the aforementioned drawbacks and limitations of the prior art constructions. Hence, a primary object of this invention is to provide a new and improved construction of adjustable support or stand for an optical observation instrument which effectively and reliably fulfills the existing need in the art and overcomes the aforementioned limitations and drawbacks prevailing in the state-of-the-art constructions.

Still a further significant object of this invention relates to a novel construction of adjustable support or stand for an optical observation instrument wherein the positional adjustment of the observation instrument can be carried out quickly and easily in a most reliable and rapid fashion.

Yet a further significant object of this invention relates to an improved adjustable stand or support for an optical observation instrument which allows for proper positioning or adjustment of the instrument quickly and reliably in an extremely simple and positive fashion.

Now in order to implement these and still further objects of the invention, which will become more readily apparent as the description proceeds, the invention contemplates a novel adjustable support or stand for an optical observation instrument, preferably a binocular microscope, the position and/or orientation of which can be freely adjusted within a desired directed spatial area and fixed. To this end, the observation device is connected through the agency of a three-axes full Carden or universal joint assembly at a spatially freely adjustable terminal piece of a pivot rod assembly mounted at a stationary support. The three-axes full Cardan joint assembly permits its free combinable rotational movement to be carried out by means of a handgrip about three axes which are perpendicular to one another. A stand or support construction of this type enables adjusting the observation instrument or device directly and in a controlled manner from a handgrip and it is simultaneously possible to orient such in the most favorable orientation direction with regard to the contemplated observation point or locality.

The terminal piece of the pivot rod assembly at which the observation device is attached through the agency of the three axes-full Cardan joint assembly is preferably a rod of a linkage parallelogram or another parallelogram guide arrangement which, through the agency of a pivot axis of a pivot joint oriented transverse to its plane is supported at a column rotatably mounted at the stationary support. In the event all of the hinge or pivot joints of the entire stand construction are constructed as single axis roller body bearings which are poor in friction, then, there is obtained the best prerequisites for a blocking or release of all of the rotary- and adjustment movements of the observation device simultaneously electrically controlled by a switch, in that for the single-axis rotary or pivot joint there can be employed electro-magnetically actuatable braking devices of known construction.

It is also possible to deliver in an intermediate position of an actuation switch preferably arranged at the hand-grip a periodically interrupted actuation current to electro-magnetically actuated brake devices for single-axis pivot joints. This subsequently simplifies the slower fine adjustment of the observation device following the course adjustment and carried out while completely releasing or unblocking all of the hinge connections or pivot joints.

By means of the inventive stand or support construction it is possible, without any difficulty, to balance out or compensate all of the gravitational moments of rotation of the three-axes full Cardan joint assembly and the observation device secured thereto with respect to the common point of intersection of the three rotational axes and to also balance out all gravitational moments of rotation of the entire stand with regard to the axis of rotation of its linkage parallelogram at column which is rotatable about its vertical lengthwise axis at the stationary support and, specifically in such a manner, that after releasing or unblocking the rotary bearing means of the observation device its position and orientation can be changed merely under the influence of external adjustment forces.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENT

Figure 1:
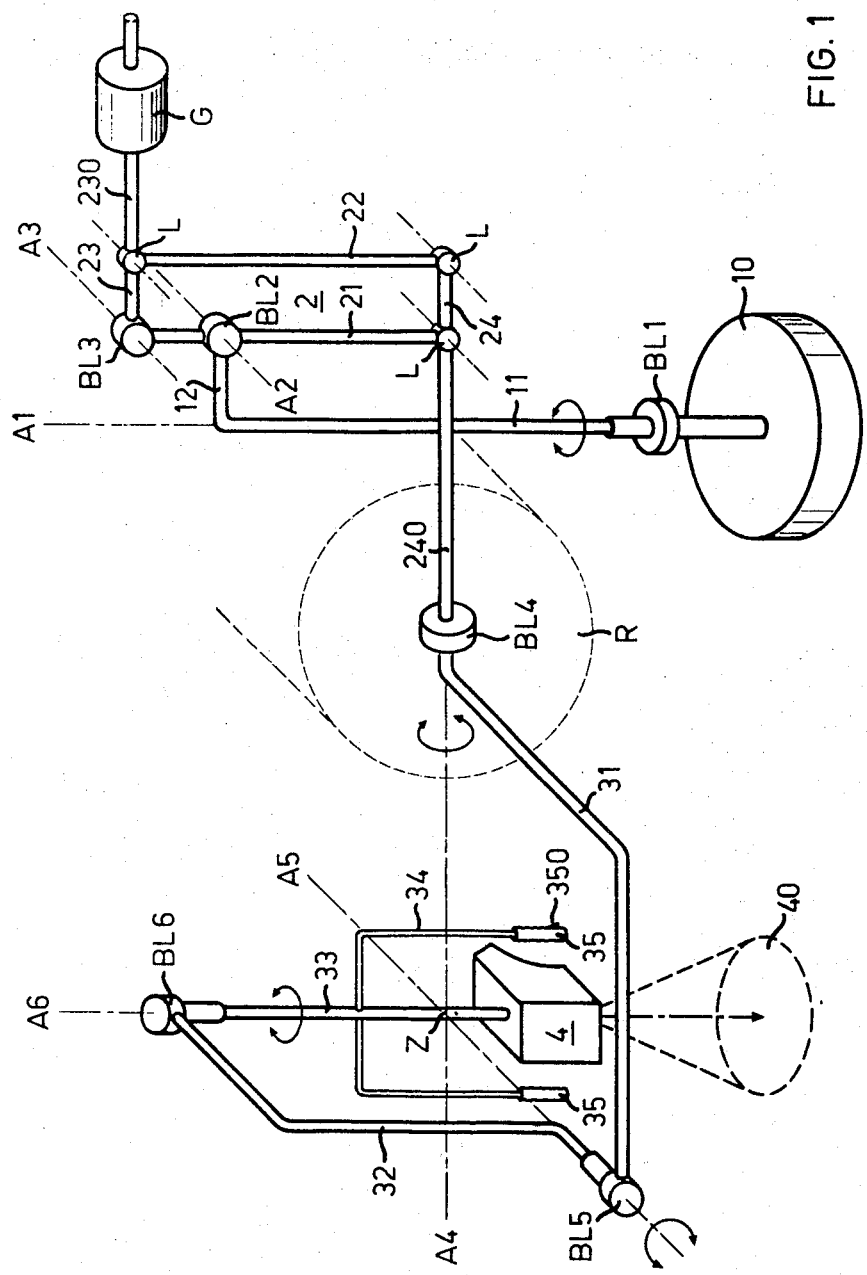
FIG. 1 is a schematic perspective view of the entire support or stand for an observation instrument or device as designed in accordance with the teachings of the present invention.
Figure 2:
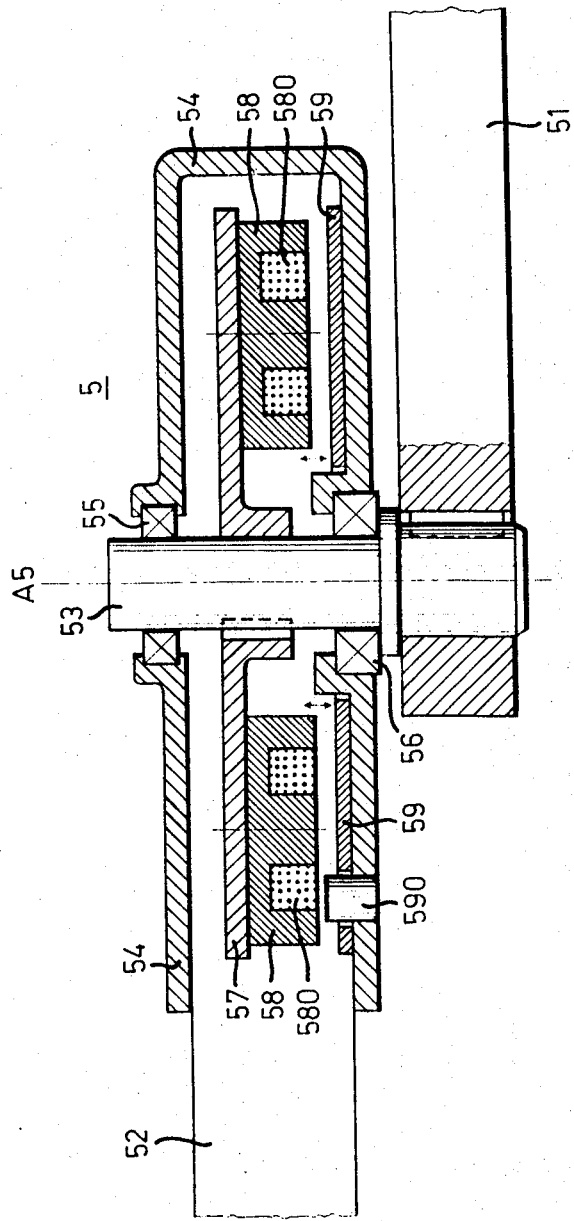
FIG. 2 is an enlarged sectional view of an electromagnetically blockable rotatable mount or bearing arrangement for two lever arms.

Describing now the drawings, in FIG. 1 there is shown a preferred construction of inventive adjustable support or stand for an optical observation instrument, wherein at a stationary pedestal or support 10 there is rotatably mounted a stand column or upright 11 for rotation about its vertical axis A1. The associated bearing or mount BL1 is constituted by a single-axis roller body bearing having an electro-magnetically actuatable blocking mechanism. Details of a possible construction of such type blockable bearing are illustrated in FIG. 2 of the drawings and will be considered more fully hereinafter.

Now at the end of a transversely extending arm 12 of the column 11 there is mounted a second blockable or lockable rotary bearing BL2, here shown oriented in a substantially horizontally extending axial direction A2, but which however is rotatable about the vertical axis A1. Now at this bearing BL2 there is pivotably mounted for movement about the axis A2 one rod 21 of a linkage parallelogram guide arrangement 2. The other rods of the linkage parallelogram 2 are designated by reference characters 22, 23 and 24. Now of the four connection joints of this linkage parallelogram 2 formed of the rods 21, 22, 23 and 24, and wherein the connection or hinge joints are each oriented in the direction of the axes $A_2$ and $A_3$ respectively, the one pivot or hinge joint connection BL3 is likewise blockable, whereas the others, each designated by reference character L, are not lockable or blockable.

Now at an extension 230 of the linkage parallelogram rod or lever 23 there is mounted a balancing weight G which can be adjusted in such a fashion that the moment of rotation of the center of gravity of all movably mounted stand components can be balanced out or equalized with regard to the axis A2 of the rotary bearing means BL2.

Continuing, it will be observed that at an extension 240 of the parallelogram rod or lever 24 there is arranged a further blockable rotary bearing means BL4, oriented in the direction of the lengthwise axis A4 of such rod 24. This bearing means BL4 is adjustable at each point of a spatial zone or area R, shown in phantom lines in FIG. 1, and circularly surrounding the stand column 11, with the orientation of axis A4 being functionally dependent upon the achieved location.

One end of a Cardan-partial frame 31 is rotatably mounted at the bearing BL4 for rotation about its axis A4. The other end of this partial frame 31 carries a blockable or lockable rotary bearing means BL5, the axis A5 of which is arranged so as to be always perpendicular to the axis A4 and intersects same. The one end of a second Cardan-partial frame 32 is rotatably mounted for movement about its axis A5 at the bearing means BL5, and at the other end thereof there is arranged a blockable rotary bearing means BL6 in such a way that its axis of rotation A6 is always directed towards the point of intersection Z of the axes A4 and A5 or the rotary bearings BL4 and BL5 respectively.

Now, coaxially mounted for rotation at the rotary bearing means BL6 is a carrier or support rod 33 for the optical instrument or device 4, preferably here considered to be a binocular microscope. This support rod 33 is fixedly connected with a handle or bracket 34, at the ends of which there are formed or otherwise provided two handgrips 35. At one of these handgrips 35 there is arranged a deblocking or release switch 350 which acts upon the blocking mechanisms of all of the bearings means BL1, BL2, BL3, BL4, BL5, and BL6. Through the agency of this deblocking switch 350 it is possible to release the blocking mechanisms of all of these bearing means for the purpose of adjusting the binocular microscope 4 throughout all of its possible degrees of freedom of movement.

The binocular microscope 4 is adjustable at its support rod 33 in such a manner that all of the gravitational moments of rotation of the three-axes full Cardan joint arrangement or assembly 31, 32, 33 can be equalized or balanced out with respect to its three rotational axes A4, A5, A6, and specifically in such a manner that the common center of gravity of the components supported at the bearing means BL4 comes to lie at the point of intersection Z of all of these three axes.

On the other hand, through the agency of non-illustrated telescoping or extension devices or compensating weights it is possible to adjust the balancing weight G at the parallelogram rod 23 in such a manner that the center of gravity of all of the components movably supported at the bearing means BL2 of the entire stand or support comes to lie at the axis A2 of this bearing. In this way the binocular microscope 4 only adjusts itself under the influence of external adjustment forces even upon release of all of the bearing blocking devices, and which external adjustment forces only bring about an acceleration of the masses and need only overcome the frictional forces prevailing at the bearing means.

By virtue of this construction and arrangement, the observer, i.e., the assumed surgeon, can readily and easily adjust the binocular microscope 4, through the agency of the handgrips 35, while actuating the deblocking switch means 350, in a direct and intended manner throughout every desired orientation and for each desired point of a spatial work area or region. Further, upon releasing the deblocking switch means 350 the instrument i.e., microscope 4 is then blocked in the previously obtained adjusted position. In the event that the microscope is provided in known manner with a device for illuminating an image field 40, then, location or determination of the desired adjustments are facilitated.

It would, of course, be possible and it is within the framework of the teachings of this invention, to replace the illustrated linkage parallelogram by many other different types of parallelogram guide arrangements having an analogous mode of operation.

Now in FIG. 2 there is illustrated an embodiment of brake bearing means BL of the type employed a number of times in different sizes in the arrangement of FIG. 1 as such has been explained above, and which has been designated in its entirety by reference character 5. This brake bearing means, after having been deblocked or released, serves to pivot both of the levers 51 and 52 relative to one another and about their connection axis A5.

The pivot pin or shaft 53 is suitably rigidly connected for rotation with the lever 51. A combination brake and bearing housing 54 rigidly connected with the other lever 52 is rotatably mounted at the shaft journal or pin 53 through the agency of both roller body bearings 55 and 56. A support disc 57 for one or a number of electromagnets 58 with therein mounted electrical coils 580 is rigidly mounted for rotation at the shaft journal 53. A brake disc 59 rigidly connected for rotation with the housing 54 through the agency of the entrainment or fixing pins 590, but which is still axially displaceable, is situated opposite the electromagnets 58. During current flow through the magnet coils 580 the movable brake disc 59 is attracted against the electro-magnets 58, and thereby blocks each rotational movement of the lever 52 relative to the lever 51.

Figure 3:
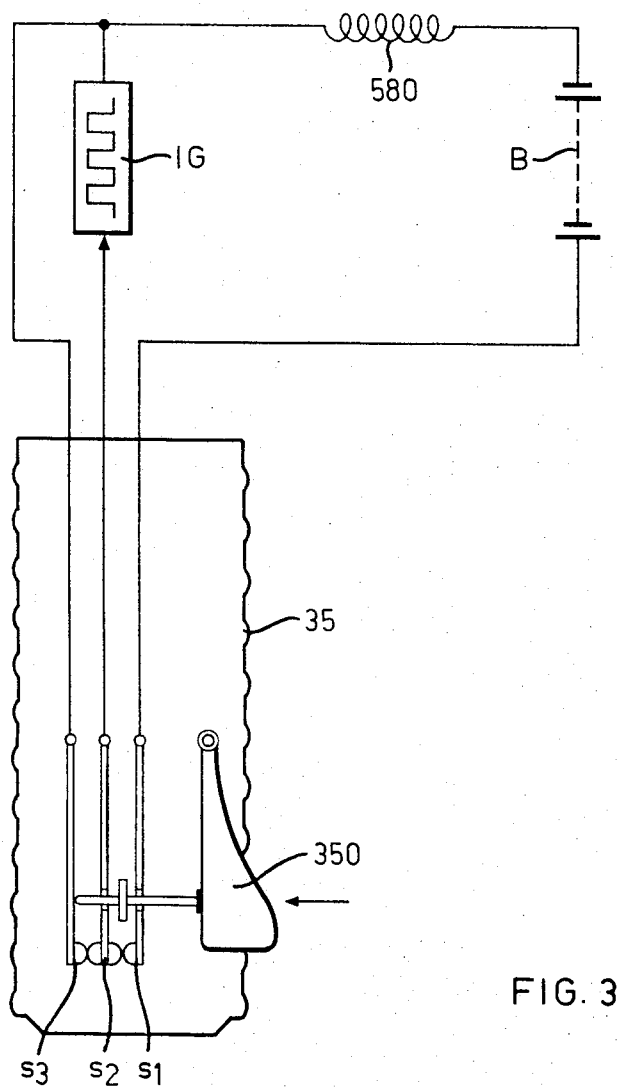
FIG. 3 is a circuit diagram suitable for actuating the bearing blocking arrangement.

Now in FIG. 3 there is illustrated by way of example a circuit diagram of circuitry suitable for the deblocking or release of the bearing means BL shown in FIG. 2. Upon pressing the actuating or switching button 350 mounted at the handgrip 35 the contact $s_3$ is open during the first phase, so that the magnetic coils 580 are no longer continuously disposed at the working current circuit of the battery B, rather now only intermittently through the agency of the pulse transmitter IG. Consequently, the bearing BL which is equipped with the blocking mechanisms of the type shown in FIG. 2 is now only intermittently released for the fine adjustment of the binocular microscope 4. When completely depressing the button or knob 350 the contact $s_2$ is also raised from the contact $s_1$ so that the coils 580 are now continuously without current and all adjustment movements of the microscope can be freely carried out without hindrance. Upon release of the switching button 350 the bearing means are again blocked.

While there is shown and described present preferred embodiments of the invention, it is to be distinctly understood that the invention is not limited thereto but may be otherwise variously embodied and practiced within the scope of the following claims. Accordingly,

What is claimed is:

1. An adjustable stand for an optical observation instrument, especially for a binocular microscope, the spatial position and/or orientation of which can be freely adjusted within a limited spatial area and fixed in desired adjusted position, comprising an observation instrument, a stationary main support, a support column rotatably mounted at the stationary main support for rotation about its vertical axis, a parallelogram guide arrangement pivotably supported by said support column, said parallelogram guide arrangement incorporating a rod member, means mounting said rod member for pivotal movement about a first substantially horizontal axis, an extension provided for said parallelogram guide arrangement, means for pivotably mounting said extension at said rod member about a second substantially horizontal axis which is essentially parallel to said first horizontal axis and in spaced relationship therefrom, said extension being provided with a terminal member, said terminal member of the extension being adjustable through an annular spatial region surrounding the vertical axis of the support column by carrying out a combined rotational movement of said support column, said rod member and said extension about the vertical axis of the support column and both of said horizontally extending axes, a three-axis Cardan joint assembly incorporating a first Cardan frame component and a second Cardan frame component, said first Cardan frame component being rotatably mounted at said terminal member of said extension, the three axes of rotation of said three-axis Cardan joint assembly intersecting at a common point, said optical observation instrument being secured to the second Cardan frame component, and at least one adjustment element for the observation instrument secured to said second Cardan frame component.

2. The adjustable stand as defined in claim 1, wherein said adjustment element comprises a handgrip.

3. The adjustable stand as defined in claim 1, wherein said parallelogram guide arrangement comprises a linkage parallelogram.

4. The adjustable stand as defined in claim 1, wherein said Cardan joint assembly and said parallelogram guide arrangement incorporate a number of bearing means each providing single-axis pivot joints, each of said bearing means being formed of relatively frictionless roller body bearings.

5. The adjustable stand as defined in claim 1, wherein the common center of gravity of the three-axis Cardan joint assembly and the observation instrument secured to the second Cardan frame component are disposed approximately at the point of intersection of the three axes of rotation of said Cardan joint assembly and being adjustable with respect to the common point of intersection of such axes, and at least one adjustable compensating weight for compensating the rotational moments produced by gravity of the movable components of the adjustable stand and the observation instrument with respect to both horizontal axes.

6. The adjustable stand as defined in claim 1, further including deblocking switch means arranged at the adjustment element of the observation instrument, said deblocking switch means being electrically connected with a multiplicity of bearing means provided at the adjustable stand, one of said bearing means being said terminal member and another incorporating said pivotably mounting means, each of said bearing means encompassing an electromagnetic blocking device so that upon actuation of the deblocking device means the blocking devices of the bearing means which otherwise block all of the rotary movements of the movable components of the stand are simultaneously released.

7. The adjustable stand as defined in claim 6, wherein said deblocking switch means is movable into an intermediate position between its switching-in and switching-out positions, said deblocking switch means when assuming said intermediate position delivering a periodically interrupted actuation current to said blocking devices of said bearing means.

8. An adjustable stand for an optical observation instrument, especially for a binocular microscope, the spatial position and/or orientation of which can be freely adjusted within a limited spatial area and fixed in desired adjusted position, comprising an observation instrument, a main support, a support column rotatably mounted at the main support for rotation about its vertical axis, a guide arrangement pivotably supported by said support column, said guide arrangement incorporating a number of rod members, means mounting one of said rod members for pivotal movement about a first substantially horizontal axis, an extension provided for said guide arrangement, means for pivotably mounting said extension at said one rod member about a second substantially horizontal axis, said extension being provided with a terminal member, said terminal member of the extension being adjustable through an annular spatial region about the support column, a three-axis Cardan joint assembly incorporating a first Cardan frame component and a second Cardan frame component, said first Cardan frame component being rotatably mounted at said terminal member of said extension, the three axes of rotation of said three-axis Cardan joint assembly intersecting at a common point, said optical observation instrument being secured to the second Cardan frame component, and at least one adjustment element for the observation instrument secured to said second Cardan frame component.

9. The adjustable stand as defined in claim 8, wherein said adjustment element comprises a handgrip provided for the observation instrument.

* * * * *